United States Patent [19]

Noguchi et al.

[11] Patent Number: 4,764,979
[45] Date of Patent: Aug. 16, 1988

[54] DIRECT RELAY EQUIPMENT

[75] Inventors: Yoshifumi Noguchi, Tokyo; Kouichi Ono; Hiroyuki Endoh, both of Yokohama, all of Japan

[73] Assignee: Fujitsu Limited, Kawasaki, Japan

[21] Appl. No.: 57,746

[22] Filed: Jun. 3, 1987

Related U.S. Application Data

[63] Continuation of Ser. No. 900,247, Aug. 25, 1986, abandoned, which is a continuation of Ser. No. 577,790, Feb. 7, 1984, abandoned.

[30] Foreign Application Priority Data

Feb. 10, 1983 [JP] Japan ................. 58-20876

[51] Int. Cl.⁴ ............................................. H04B 7/14
[52] U.S. Cl. ...................................... 455/22; 455/15; 455/17; 379/347
[58] Field of Search .............. 455/15, 17, 20-22; 379/344, 347

[56] References Cited

U.S. PATENT DOCUMENTS

| | | | |
|---|---|---|---|
| 4,198,600 | 4/1980 | Oguchi et al. | 455/15 |
| 4,253,191 | 2/1981 | Oguchi | 455/21 |

FOREIGN PATENT DOCUMENTS

| | | | |
|---|---|---|---|
| 3004019 | 8/1980 | Fed. Rep. of Germany | 455/22 |
| 2057218 | 4/1971 | France | 455/22 |
| 55-26737 | 2/1980 | Japan | 455/20 |

OTHER PUBLICATIONS

Patents Abstracts of Japan, vol. 4, No. 56, Apr. 25, 1980, pp. 105, E-8.
Electric Engineering, "Hybrid I.Cs. A Major Factor in Microwave Component Development", Oliver, vol. 43, No. 519, May 1971, pp. 41-43.
8th European Microwave Conference, "Study of a Two Carriers Solid State Straight Through Repeater at 7.5 GHz", Rouffet et al., 9/4-8/78, pp. 620-625.
International Conference on Communications, "Digital Modulation Techniques", Walker et al., Jun. 1973, pp. 28-20-28-24.

Primary Examiner—Michael A. Masinick
Attorney, Agent, or Firm—Staas & Halsey

[57] ABSTRACT

Direct relay equipment includes a first antenna, a second antenna, an up direction circuit connected from the first antenna via a first circulator to the second antenna via a second circulator, and a down direction circuit connected from the second antenna via the second circulator to the first antenna via the first circulator. In the up direction circuit and the down direction circuit, the received signal having a frequency $f_1$ from the first (or second) antenna is amplified by a microwave amplifier, the output of the microwave amplifier is converted to a signal having a frequency $f_2$ (sending frequency), the signal having the frequency $f_2$ is amplified by the same amplifier, and the amplified signal having a frequency $f_2$ is sent from the second (or first) antenna.

5 Claims, 3 Drawing Sheets

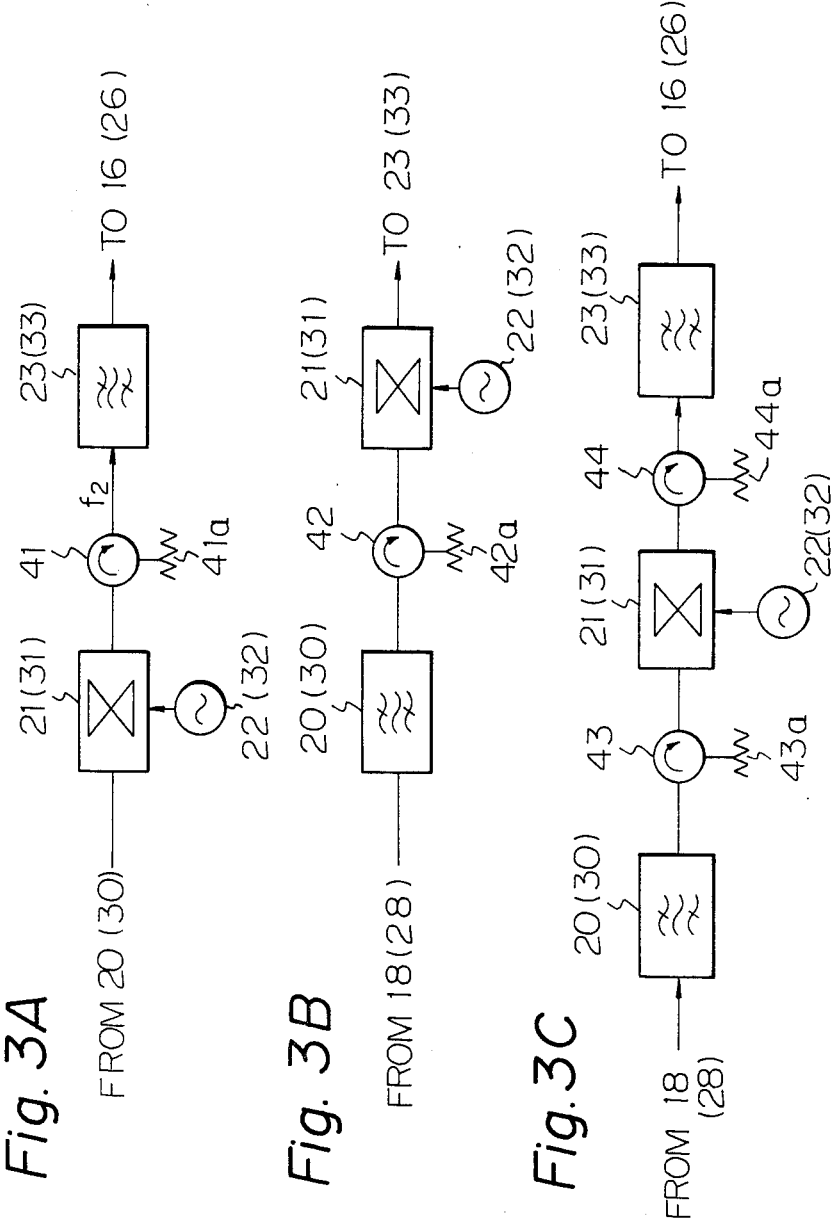

DIRECT RELAY EQUIPMENT

This is a continuation of co-pending application Ser. No. 900,247, filed on Aug. 25, 1986, now abandoned, which is a continuation application of Ser. No. 577,790, filed on Feb. 7, 1984, now abandoned.

BACKGROUND OF THE INVENTION

1. Field of the Invention

The present invention relates to frequency-shift type direct relay equipment employed for microwave multiplex radio relay systems.

2. Description of the Prior Art

The development of field effect transistors for microwave amplification made it possible to directly amplify the microwave signals, that is, making it possible to form a direct relay device for directly amplifying and relaying microwave signals in microwave multiplex radio systems. However, in this type of direct relay equipment, the receiving frequency is different from the transmitting frequency. Therefore, the received signals must be amplified through a microwave amplifier, converted into a transmitting frequency through a mixer, and the converted signals amplified and transmitted. Thus, in this type of equipment, an up circuit and a down circuit each need two amplifiers, that is, the direct relay circuit as a whole needs four amplifiers, to amplify the received signals and the transmitted signals, respectively. Microwave amplifiers are expensive components, therefore the direct relay equipment becomes expensive no matter how its construction is simplified.

It was proposed to amplify the received signals and the transmitted signals having a shifted frequency through a single microwave amplifier. However, problems arose with regard to interference between the received signals and the transmitted signals, and strict characteristics are required for the band-pass filters. These problems have not been solved as yet.

SUMMARY OF THE INVENTION

An object of the present invention is to reduce interference between the received signals and the transmitted signals as well as to mitigate the strict requirements for the band-pass filter characteristics in frequency-shift type direct relay equipment which employs a single microwave amplifier.

The above-mentioned object can be achieved by providing direct relay equipment comprising a first antenna and a second antenna, in which a first band-pass filter is connected to the first antenna via a first circulator, and has a center frequency equal to that of the received signal; and a second circulator which receives the output of the first band-pass filter. The second band-pass filter receives the output of the first band-pass filter sent through the forward coupling of the second circulator, and has a center frequency equal to that of the transmitted signal. A first amplifier receives the output which is reflected by the second band-pass filter back to the second circulator, and sent through the forward coupling of the second circulator; a third circulator receives the output of the first amplifier; and a third band-pass filter receives the output of the first amplifier sent through the forward coupling of the third circulator, and which has a center frequency equal to that of the received signal. A first mixer receives the output of the third band-pass filter to convert it into the transmitting frequency signal, and applies the converted signals via the second band-pass filter to the first amplifier. The fourth band-pass filter receives the output sent at the transmitting frequency from the first amplifier to the third circulator, reflected by the third band-pass filter back to the third circulator, and introduced via the forward coupling of the third circulator. A fourth circulator applies the output of the fourth band-pass filter to the second antenna; a fifth band-pass filter is connected to the second antenna via the fourth circulator, and has a center frequency equal to that of the received signal; and a fifth circulator receives the output of the fifth band-pass filter. The sixth band-pass filter receives the output of the fifth band-pass filter sent through the forward coupling of the fifth circulator, and has a center frequency equal to that of the transmitted signal. A second amplifier receives the output which is reflected by the sixth band-pass filter back to the fifth circulator, and sent through the forward coupling of the fifth circulator; and a sixth circulator receives the output of the second amplifier. The seventh band-pass filter receives the output of the second amplifier sent through the forward coupling of the sixth circulator, and has a center frequency equal to that of the received signal. A second mixer receives the output of the seventh band-pass filter to convert it into the transmitting frequency signal, and applies the converted signals via the sixth band-pass filter to the second amplifier; and an eighth band-pass filter receives the output sent at the transmitting frequency from the second amplifier to the sixth circulator, reflected by the seventh band-pass filter back to the sixth circulator, and introduced via the forward coupling of the sixth circulator. The output of the eighth band-pass filter is supplied via the first circulator to the first antenna.

Further features and advantages of the present invention will be apparent from the ensuing description with reference to the accompanying drawings which, however, in no way limit the scope of the present invention.

BRIEF DESCRIPTION OF THE DRAWINGS

FIGS. 3A, 3B, and 3C are block diagrams of peripheral circuits of a mixer shown in FIG. 2.

DESCRIPTION OF THE PREFERRED EMBODIMENTS

Figure 1:
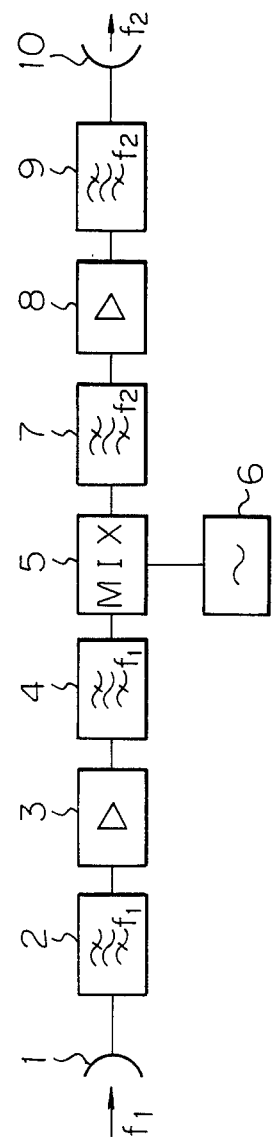
FIG. 1 a block diagram of one example of a conventional direct relay device.

FIG. 1 is a circuit diagram of a conventional frequency-shift type direct relay device. The circuit shown in FIG. 1 is used as the up or the down circuit. On one hand, the received signal having a frequency of, for example, 6000 MHz, is received from an antenna 1, and an interference wave is removed by a filter 2. An amplifier 3 effects low level amplification, the output of the amplifier 3 is supplied to a filter 4, where an image signal is removed, and the output of the filter 4 is supplied to a mixer 5. On the other hand, a shift generator 6 effects an oscillation at a shift frequency, for example, 160 MHz, the mixer 5 generates an output having a frequency of 6,160 MHz, and the output of the mixer 5 is supplied to the filter 7. In the filter 7, any spurious signal is removed from the received signal, an amplifier 8 effects high level amplification, and the output of the amplifier 8 is supplied to a filter 9. The output of the filter 9 is supplied to an antenna 10.

In the circuit shown in FIG. 1, two amplifiers 3 and 8 are required, as already mentioned.

Figure 2:
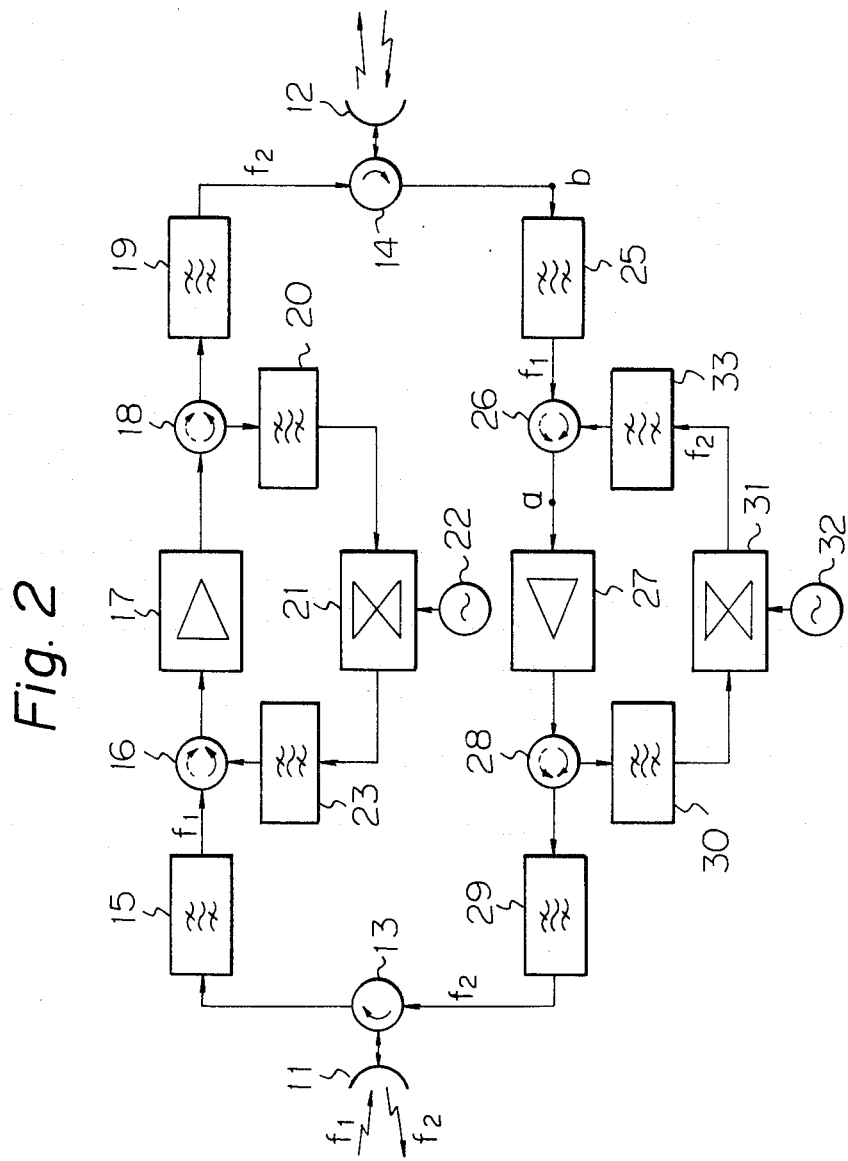
FIG. 2 is a block diagram of one embodiment of a direct relay device according to the present invention.

FIG. 2 is a block diagram of an embodiment of the present invention, in which reference numerals 11 and 12 denote first and second antennas, 13 and 14 denote circulators coupled to the antennas, 15 and 25 denote band-pass filters having a center frequency $f_1$, reference numerals 16, 26, 18, and 28 denote circulators, 17 and 27 denote microwave amplifiers, 19 and 29 denote band-pass filters having a center frequency $f_2$, 20 and 30 denote band-pass filters having a center frequency $f_1$, 21 and 31 denote mixers, 22 and 32 denote oscillators, and 23 and 33 denote band-pass filters having a center frequency $f_2$. The frequency $f_1$ signal received by the first antenna 1 is applied to the band-pass filter 15 via the circulator 13. The band-pass filter 15 removes signals of undesired bands, and a received signal having the frequency $f_1$ only is applied to the circulator 16.

The circulator 16 has a coupling direction as indicated by the solid line arrow. Here, since the band-pass filter 23 has the center frequency $f_2$, the signal having the frequency $f_1$ heading from the circulator 16 to the band-pass filter 23 is reflected back to the circulator 16, and is applied to the microwave amplifier 17 via the circulator 16. The output of the amplifier 17 is applied to the circulator 18, which has a coupling direction as indicated by the solid line arrow. Therefore, the received signal of the frequency $f_1$ is added to the mixer 21 via the band-pass filter 20 having the center frequency $f_1$. This received signal is mixed with the output of the oscillator 22 through the mixer 21, converted into a signal of the frequency $f_2$, applied to the band-pass filter 23 having the center frequency $f_2$, and is added to the amplifier 17 via the circulator 16.

The signal having the frequency $f_2$ is amplified through the amplifier 17, and the amplified output is added to the circulator 18. Since the band-pass filter 20 has the center frequency $f_1$, as mentioned above, the signal having the frequency $f_2$ is reflected, enters into the circulator 18, and is applied, via the circulator 18, to the band-pass filter 19 having the center frequency $f_2$. The signal which is passed through the band-pass filter 19 is sent to the second antenna 12 via the circulator 14, and is transmitted at a transmitting frequency $f_2$.

The signal having the frequency $f_1$ received by the second antenna 12 is also amplified by the amplifier 27, in the same manner as described above, subjected to frequency conversion through the mixer 31, amplified again through the amplifier 27, and is transmitted at the transmitting frequency $f_2$ from the first antenna 11.

Thus, the signal having the frequency $f_1$ received by the first antenna 11 is transmitted at the frequency $f_2$ from the second antenna 12, and the signal having the frequency $f_1$ received by the second antenna 12 is transmitted at the frequency $f_2$ from the first antenna 11. Namely, the signal is amplified through a signal amplifier 17 or 27; making it possible to economically construct the direct relay device. The amplifiers 17, 27 have an automatic gain control (AGC) function to produce a stable transmitting power. Therefore, even when there are variations in the received power, the relay operation can be stably carried out. The AGC function may be obtained by any known circuit setup.

In the above-mentioned direct relay equipment, the coupling directions of the circulators 16, 18, 26 and 28 are selected as indicated by the solid line arrows, in order to reduce the interference caused by roundabouts, as explained below.

The direction in which the signal received by the first antenna 11 is transmitted from the second antenna 12 is regarded as the up direction, and the direction in which the signal received by the second antenna 12 is transmitted from the first antenna 11 is regarded as the down direction.

The following is a consideration of the effect caused by the signal transmitted in the up direction which enters by roundabout ways into the down direction circuit. The transmitted signal having the power of Pt in the up direction is applied to the band-pass filter 25 through a reverse coupling of the circulator 14, sent to the circulator 26 via the band-pass filter 25, sent to the amplifier 27 through a reverse coupling of the circulator 26, is amplified and sent to the band-pass filter 30 through a forward coupling of the circulator 28, mixed with the output of the oscillator 32 in the mixer 31, converted into the same signal as a received signal in the down direction, sent to the circulator 26 via the band-pass filter 33, and is sent to the amplifier 27 through a forward coupling of the circulator 26.

Therefore, the undesired signal U at the input point a of the amplifier 27 travels through a circuit which consists of 14→25→26 (reverse coupling)→27→28 (forward coupling)→30→31→33→26 (forward coupling). In this case, the signal is subjected to attenuation L14 caused by a reverse coupling of the circulator 14, attenuation LF25 which the band-pass filter 25 having the center frequency $f_1$ gives to the signal of the frequency $f_2$, attenuation L26 caused by a reverse coupling of the circulator 26, amplification by the gain G of the amplifier 27, attenuation LF30 caused by the band-pass filter 30 having the center frequency $f_1$, conversion loss $\eta$ caused by the mixer 31, and attenuation LF33 caused by the band-pass filter 33 having the center frequency $f_2$. Attenuation by a forward coupling of the circulators 26 and 28 can be virtually neglected. Therefore, the undesired signal U at the point a is given by the following equation, $$U = Pt - L14 - LF25 - L26 + G - LF30 - LF33 - \eta \quad (1)$$

If the coupling direction of the circulator 26 is reversed, as indicated by the dotted line arrow, the signal is sent from the band-pass filter 25 to the amplifier 27 through a forward coupling of the circulator 26, wherein the attenuation is negligibly small. In this case, the undesired signal U' at the point a is given by the following equation, $$U' = Pt - L14 - LF25 + G - LF30 - LF33 - \eta \quad (2)$$

If the undesired signals U and U' have levels smaller than that of the received signal Pr in the down direction, the amplifier 27 properly exhibits the AGC function. For this purpose, the condition Pr>U or Pr>U' must hold true, as shown by the following equations, $$Pr > Pt - L14 - LF25 - L26 + G - LF30 - LF33 - \eta$$

$$\therefore LF25 + LF30 + LF33 > Pt - L14 - L26 - \eta + G - Pr \quad (3)$$

Further, $$Pr > PT - L14 - LF25 + G - LF30 - LF33 - \eta$$

$$\therefore LF25 + LF30 + LF33 > Pt - L14 - \eta + G - Pr \quad (4)$$

That is, as will be obvious from a comparison of equation (3) with equation (4), if the coupling direction of the circulator 26 is selected as indicated by the solid line arrow, the attenuation quantities of the band-pass filters 25, 30, and 33 can be reduced by an amount corresponding to attenuation L26, by the reverse coupling of the circulator 26. This indicates that construction of the band-pass filters 25, 30, and 33 can be simplified.

The advantage which stems from the coupling direction of the circulator 26 that is set as indicated by the solid line arrow also holds true for the circulator 16. That is, by setting the coupling direction as indicated by the solid line arrow, the construction of the band-pass filters 15, 20, and 23 can be simplified.

Next, the effect caused when the received signal in the up direction enters into the down direction circuit by roundabout ways, is considered. The received signal having a power of Pr' in the up direction introduced through the band-pass filter 15 is amplified through the amplifier 17, sent to the circulator 14 via a reverse coupling of the circulator 18 and band-pass filter 19, and is sent to the band-pass filter 25 via a reverse coupling of the circulator 14. In this case, if the circulator 18 has a coupling direction as indicated by the solid line arrow, the undesired signal U1 at the point b is given by the following equation, $$U1 = Pr' + G - L18 - LF19 - L14 \quad (5)$$

as in the above-mentioned case. Here, L18 denotes attenuation by the reverse coupling of the circulator 18, and LF19 denotes attenuation caused by the passage of a signal having the frequency $f_1$ through the band-pass filter 19 having the center frequency $f_2$.

When the circulator 18 has the coupling direction as indicated by the dotted line arrow, the received signal Pr' is sent to the band-pass filter 19 via a forward coupling of the circulator 18, wherein the attenuation is negligibly small. Therefore, the undesired signal U1' at the point b is given by the following equation, $$U1' = Pr' + G - LF19 - L14 \quad (6)$$

In order for the amplifier 27 to properly exhibit the AGC function, the received signal Pr in the down direction must have a level which is greater than that of the undesired signals U1 and U1', as shown by the following equations, $$Pr > Pr' + G - L18 - LF19 - L14$$

$$\therefore LF19 > G - L18 - L14 + Pr' - Pr \quad (7)$$

Further, $$Pr > Pr' + G - LF19 - L14$$

$$\therefore LF19 > G - L14 + Pr' - Pr \quad (8)$$

That is, by setting the coupling direction of the circulator 8 as indicated by the solid line arrow, the attenuation quantity of the band-pass filter 19 for the signal of the frequency $f_1$ can be reduced by the attenuation quantity caused by a reverse coupling of the circulator 18, as is obvious from a comparison of equation (6) with equation (7). This indicates that construction of the band-pass filter 19 can be simplified. Similarly, by setting the coupling direction of the circulator 28 as indicated by the solid line arrow, construction of the band-pass filter 29 can be simplified.

FIGS. 3A, 3B, and 3C show peripheral circuits of the mixer shown in FIG. 2. In the mixer circuit shown in FIG. 3A, an isolator 41 is usually connected between the mixer 21 (or 31) and the filter 23 (or 33) so that the echo frequency wave is absorbed. As shown in FIG. 3B, the isolator 42 may be connected between the mixer 21 (or 31) and the filter 20 (or 30); that is, in the input side of the mixer 21 (or 30). In the circuit shown in FIG. 3B, the same effect as that of FIG. 3A can be obtained. The isolator may be connected at both the input side and the output side of the mixer circuit 21, as shown in FIG. 3C. Further, the isolators 41, 42, 43, and 44 can be included in the mixers 21 or 31 respectively.

In the present invention, the unnecessary wave having, for example, a frequency $f_x$, which penetrates from the output terminal of the mixer 21 or 31 can be terminated via the isolator 41 (or 42, 43, 44) to a dummy load 41a (or 42a, 43a, 44a).

As described above, by setting the coupling directions of the circulators 16, 18, 26, and 28 as indicated by the solid line arrows, the entrance of the transmitted signals of the up direction or the down direction into the circuit of the down direction or the up direction through roundabout ways can be reduced, and further, the received signals of the up direction or the down direction entering into the circuit of the down direction or the up direction through roundabout ways can be reduced. Therefore, the relay amplification operation can be stably performed despite the simplified construction of the band-pass filters.

According to the present invention as explained above, the received signal of the frequency $f_1$ is amplified through the amplifiers 17 and 27, converted into a signal having the frequency $f_2$ through the mixers 21 and 31, and the converted signal is amplified by the amplifiers 17 and 27. Accordingly, the received signal and transmitted signal are amplified by the same amplifier, making it possible to economically utilize the microwave amplifier. Furthermore, by specifying the coupling directions of the circulators, interference between the signal of the up direction and the signal of the down direction can be reduced, and the strict requirements for the band-pass filter characteristics can be alleviated, enabling the band-pass filters to be economically constructed.

We claim:
1. Direct relay equipment comprising:
   first antenna means for receiving a first signal having a first frequency and transmitting a fourth signal having a second frequency;
   a first circulator having a first port, operativley connected to said first antenna means, for receiving and transmitting the first signal, having a second port for outputting the first signal and having a third port, said first circulator rotating in a direction in which the first signal is received or transmitted;
   a first band-pass filter, operatively connected to the second port of said first circulator, having a center frequency equal to the first frequency, for passing signals having the first frequency;
   a second circulator having a first port directly connected to said first band-pass filter for receiving signals having the first frequency from said first band-pass filter and having a second port and a third port, the first port transmitting the signals having the first frequency to the second port, the second port transmitting the signals having the first frequency from the first port to the third port, and the third port transmitting the signals having the first frequency to the first port;

a second band-pass filter, operatively connected to the second port of said second circulator, and having a center frequency equal to the second frequency, for reflecting signals having the first frequency back to the second port of said second circulator and being operatively connected to receive signals having the second frequency;

a first amplifier, operativley connected to the third port of said second circulator, for amplifying signals received from said second circulator;

a third circulator having a first port operatively connected to said first amplifier and having a second port and a third port;

a third band-pass filter, operatively connected to the second port of said third circulator and having a center frequency equal to the first frequency, for passing signals having the first frequency and reflecting signals having frequencies other than the first frequency back to said third circulator;

a first mixer, operatively connected to said third band-pass filter, for converting signals having the first frequency into a second signal having the second frequency, and applying the second signal to said first amplifier via said second band-pass filter and said second circulator;

a fourth band-pass filter, operatively connected to the third port of said third circulator, for passing signals having the second frequency received from said first amplifier via said third circulator;

a fourth circulator, having a first port operatively connected to said fourth band-pass filter, for receiving and transmitting signals having the second frequency from said fourth band-pass filter, and having a second port and a third port, said fourth circulator rotating in a direction in which the signals having the second frequency are received or transmitted;

second antenna means, operatively connected to the second port of said fourth circulator, for transmitting signals having the second frequency received from said fourth band-pass filter via said fourth circulator, and for receiving a third signal having the first frequency;

a fifth band-pass filter, operatively connected to the third port of said fourth circulator, having a center frequency equal to the first frequency, for receiving the third signal having the first frequency;

a fifth circulator having a first port directly connected to said fifth band-pass filter, for receiving signals having the first frequency from said fifth band-pass filter, and having a second port and a third port, the first port transmitting the signals having the first frequency to the second port, the second port transmitting the signals having the first frequency from the first port to the third port, and the third port transmitting the signals having the first frequency to the first port;

a sixth band-pass filter, operatively connected to the second port of said fifth circulator, having a center frequency equal to the second frequency, for passing signals having the second frequency and reflecting signals having frequencies other than the second frequency back to said fifth circulator;

a second amplivley, operativley connected to the third port of said fifth circulator, for amplifying signals received from said fifth circulator;

a sixth circulator having a first port operatively connected to said second amplifier and having a second port and a third port;

a seventh band-pass filter, operatively connected to the second port of said sixth circulator, having a center frequency equal to the first frequency, for passing signals having the first frequency and reflecting signals having frequencies other than the first frequency back to said sixth circulator;

a second mixer, operatively connected to said seventh band-pass filter, for converting signals having the first frequency into the fourth signal having the second frequency, and applying the fourth signal, via said sixth band-pass filter and said fifth circulator, to said second amplifier; and an eighth band-pass filter, operatively connected to the third port of said sixth circulator and to the third port of said first circulator, for passing the fourth signal having the second frequency to said first antenna via said first circulator.

2. Direct relay equipment according to claim 1, wherein said first and second mixers each have an input terminal and an output terminal, further comprising an isolator operatively connected to at least one side of the output terminals and the input terminals of said first and second mixers.

3. Direct relay equipment according to claim 1, wherein said first and second mixers each have an input terminal and an output terminal, further comprising an isolator operatively connected to the input terminals of said first and second mixers.

4. Direct relay equipment according to claim 1, wherein said first and second mixers each have an input terminal and an output terminal, further comprising an isolator operatively connected to the output terminals of said first and second mixers.

5. Direct relay equipment according to claim 1, wherein said first and second mixers each have an input terminal and an output terminal, further comprising an isolator operatively connected to the input terminals and the output terminals of said first and second mixers.

* * * * *